United States Patent
Kinard et al.

(12)

(10) Patent No.: US 6,346,185 B1
(45) Date of Patent: Feb. 12, 2002

(54) METHOD AND ELECTROLYTE FOR ANODIZING VALVE METALS TO HIGH VOLTAGE

(75) Inventors: John Tony Kinard; Brian John Melody, both of Greer; David Alexander Wheeler, Williamston; Philip Michael Lessner, Simpsonville, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/693,833

(22) Filed: Oct. 23, 2000

(51) Int. Cl.$^7$ ............................. C25D 9/00; C25D 11/06; C25D 11/04; E04B 1/74; C23C 8/80

(52) U.S. Cl. ..................... 205/316; 205/332; 205/333; 205/324; 252/62.2; 148/277; 148/284; 148/285

(58) Field of Search ................... 205/316, 332, 205/333, 324; 252/62.2; 148/277, 284, 285

(56) References Cited

U.S. PATENT DOCUMENTS

| | | | |
|---|---|---|---|
| 1,710,073 A | 4/1929 | Ruben | 361/526 |
| 1,891,207 A | 12/1932 | Ruben | 361/506 |
| 1,900,018 A | 3/1933 | Lilienfeld | 330/309 |
| 1,986,779 A | 1/1935 | Lilienfeld | 361/526 |
| 2,013,564 A | 9/1935 | Lilienfeld | 361/526 |

OTHER PUBLICATIONS

JP 70–021513 B, Japan Abstract Only, No date, Japan Gas Chem Co.*

Brian Melody, "The Potential For Positive Tab Corrosion In High Voltage Aluminum Electrolytic Capacitors Caused By Electrolytic Decomposition Products", 1993, No Month Available.

Panitz, Sharp and Melody, "The Use of Synthetic Hydrotalcite As A Chloride Ion Getter For A Barrier Aluminum Anodization Process", 1996, No Month Available.

* cited by examiner

*Primary Examiner*—Edna Wong
(74) *Attorney, Agent, or Firm*—Banner & Witcoff, Ltd.

(57) ABSTRACT

A method of anodizing valve metals with a borate polyester solution formed by the combining 2-methyl-1,3-propane diol and boric acid and heating to about 130 to about 160° C. The heating drives off water produced by esterification. A substrate is immersed in the borate polyester electrolyte solution at a temperature of about 25° C. to about 85° C. and an anodizing voltage is applied.

11 Claims, No Drawings

METHOD AND ELECTROLYTE FOR ANODIZING VALVE METALS TO HIGH VOLTAGE

FIELD OF THE INVENTION

The invention is directed to a method and electrolyte for anodizing valve metals to high voltage.

BACKGROUND OF THE INVENTION

The dawn of radio broadcasting in the first decades of the twentieth century, and the growing demand for fractional horsepower motors requiring phase-splitting capacitors during this same period, combined to give impetus to the development and sale of high voltage aluminum electrolytic capacitors. These devices, which employ a thin film of anodic aluminum oxide as the capacitor dielectric, have found increasing use throughout the decades of the twentieth century and are now used in electric welders, electric vehicles, and other industrial applications. The relatively high capacitance per unit volume and high voltage capability at relatively low cost also make these devices useful for other applications, such as weaponry (so-called "rail guns", etc.) and medical applications where they are used in implantable defibrillators which are often incorporated into heart pacemaker designs.

The performance and cost effectiveness of aluminum electrolytic capacitors depends upon the production of high quality anodic oxide films on the capacitors anode foils. The production process and electrolytes which have been used to produce these films since the 1930's are described in the chapters on foil anodizing in the books by Deeley and Georgiev: "Electrolytic Capacitors—The Theory, Construction, Characteristics, and Application of All Types" by Paul McKnight Deeley, published by The Cornell-Dubilier Electric Corp., South PlainField, N.J., 1938; and "The Electrolytic Capacitor" by Alexander M. Georgiev published by The Technical Division of Murray Hill Books, Inc., New York, 1945.

These works describe the use of a series of electrolyte solutions through which the electrified anode foil is passed to produce the anodic oxide film. The solutions contain boric acid and borax (hydrated sodium tetraborate) in varying concentrations so as to produce a series of electrolyte baths of increasingly higher resistivity. The foil passing through these electrolyte solution baths is biased positive and the baths are biased at progressively higher negative potential such that the anodic oxide film grows progressively thicker as the foil passes through baths containing electrolytes of progressively higher resistivity and biased to progressively higher voltages. The last electrolyte solution may contain only boric acid and have a resistivity of several thousand ohm-cm at 90° C. Deeley describes the voltage capability of this method/electrolyte combination as about 800 volts.

The above-cited volumes describe many ionogens which may be employed for anodizing capacitor foil to relatively low voltages (i.e., up to 300 or 400 volts), such as phosphate salts, the salts of organic acids, etc., but high voltage (above about 500 volts) anodizing has been carried-out almost exclusively in aqueous boric acid solutions.

Relatively recently, a method and aqueous electrolyte suitable for anodizing aluminum to approximately 900 to 1000 volts has appeared in the technical literature ("The Use of Synthetic Hydrotalcite as a Chloride Ion Getter for a Barrier Aluminum Anodization Process", by J. K. G. Panitz, D. J. Sharp, and Brian Melody, *Plating and Surface Finishing*, December, 1996, pages 52–56). This method basically consists of anodizing aluminum at constant current in a room temperature dilute (high resistivity) solution of ammonium tartrate which has been depleted of chlorine ions down to approximately the 10 ppb level through the use of synthetic hydrotalcite scavenging. While this method of anodizing avoids the use of concentrated boric acid solutions (100 to 200 grams/liter) for the highest voltages, it has proven difficult to apply to reel-to-reel anodizing and is, by its nature, better suited to "batch anodizing", in which pre-cut foils are anodized while suspended in the anodizing tank (instead of continuously advancing, as in the reel-to-reel anodizing).

It has been realized for many years that high-voltage anodic oxide films of high quality can be readily produced in organic solvent solutions of relatively low free water content. In U.S. Pat. No. 1,710,073, Samuel Ruben describes the use of glycerine solutions of boric acid and borax as a "fill" or "working" electrolyte for electrolytic capacitors. This electrolyte may be used to anodize aluminum to a few hundred volts with good results.

By 1930, Ruben had realized that the inherent limitations of glycerine/borate electrolytes, i.e., the tendency of these electrolytes to oxidize with the production of brown deposits on the anode foil surface during aluminum anodizing above about 150 to 200 volts, and obtained U.S. Pat. No. 1,891,207, which covers the use of ethylene glycol, boric acid, and ammonium borate electrolyte solutions (claim 7 and others). As indicated in the Georgiev book, cited above, (on page 72) properly formulated glycol-borate electrolytes are capable of anodizing aluminum to several hundred volts, with a maximum voltage capability of approximately 600 volts.

The ethylene glycol-based electrolytes must be almost totally esterified to the glycol-borate polyester for use as anodizing electrolytes above about 400 volts. If a significant amount of free ethylene glycol is present, the anodic oxidation products (oxalic acid, formic acid, etc.) of the glycol will attack the aluminum anode material. This corrosive attack by ethylene glycol oxidation products is described in "The Potential for Positive Tab Corrosion in High Voltage Aluminum Electrolytic Capacitors Caused By Electrolytic Decomposition Products", by Brian Melody, presented at the 1993 Capacitor and Resistor Technology Symposium, pages 199–205, *Symposium Proceedings*.

The anodizing voltage range of organic solvent-based electrolyte solutions was greatly extended by Julius Edgar Lilienfeld, who described the preparation and use of the esterification (condensation) product of boric acid with triethylene glycol in U.S. Pat. No. 2,013,564. Lilienfeld later extended this work to include other glycols, such as diethylene glycol, and other acids in addition to boric acid, such as citric acid and tartaric acid, in U.S. Pat. No. 1,986,779. The highest anodizing voltage capability of these materials is associated with the borate esters of glycols having at least 2 ethylene oxide groups (i.e., diethylene glycol, triethylene glycol, etc.)

The present inventors duplicated the borate polyester formed by the reaction of triethylene glycol with an equivalent amount of boric acid. This polyester forms upon heating the two ingredients to 130 to 160° C. to drive off the water produced by esterification. It was found that triethylene glycol borate polyester solution may be used to anodize aluminum foil to 1,500 volts, at a temperature of 150° C. to 160° C. (1 mA/cm$^2$ current density). This oxide thickness is equivalent to over 1,790 volts at 85° C. or approximately 1,980 volts at 50° C.

Thus, polyglycol borate esters, although well suited for the high voltage anodizing of aluminum for high voltage electrolytic capacitor use, are not suitable as anodizing media. Borate polyesters of ethylene glycol, glycerine, diethylene glycol, triethylene glycol, and the like are all solid at room temperature. These borate polyesters must be heated to temperatures substantially above the boiling point of water to render them sufficiently fluid for anodizing use. For example, the borate polyester of triethylene glycol must be heated to 150 to 160° C. for sufficient fluidity for anodizing. Moreover, these materials tend to become increasingly more viscous with time at elevated temperatures, limiting their service life.

SUMMARY OF THE INVENTION

It is an object of the invention to produce a borate polyester product that remains liquid at temperatures as low as 25° C. or even lower.

It is another object of the invention to produce a high resistivity liquid (in excess of 100,000 ohm-cm) capable of producing a very high voltage anodic oxide on valve metals, particularly aluminum.

It is another object of the invention to provide a borate polyester solution that does not require heating to high temperatures for anodizing.

It is another object of the invention to provide a borate polyester solution that allows anodizing of aluminum substrates at temperatures of about 25 to 85° C.

The invention is directed to a method of anodizing valve metals with a borate polyester solution formed by combining 2-methyl-1,3-propane diol and boric acid and heating to about 130 to about 160° C. which drives off the water produced by esterification.

The invention is further directed to a borate polyester solution prepared by reacting 2-methyl-1,3-propane diol and boric acid.

It is to be understood that both the foregoing general description and the following detailed description are exemplary and explanatory only and are not restrictive of the present invention as claimed.

DETAILED DESCRIPTION OF THE PREFERRED EMBODIMENTS

It was discovered that 2-metbyl-1,3-propane diol reacts with boric acid to produce a borate polyester product which remains liquid at temperatures as low as 25° C. or even lower. Because of the relatively high melting/softening points of other borate polyesters, it was unexpected that the borate polyester condensation product of boric acid and 2-methyl-1,3-propane diol would remain a liquid at room temperature. While not wishing to be bound by any particular theory, it is believed that the relatively low melting point of the 2-methyl-1,3-propane diol/polyborate is due to the stearic hindrance to hydrogen bonding resulting from the methyl group present in the diol structure.

This electrolyte composition formed by the thermal condensation product between boric acid and 2-methyl-1,3-propane diol is also easier to handle than other glycol-borates due to an inherent resistance to hardening due to loss of the solvent from the solution. Although half or more of the solution volume may be lost to evaporation, the 2-methyl-1,3-propane diol borate will remain fluid at least down to about 25° C.

Thus, in one embodiment, the invention is directed to a borate polyester electrolyte solution formed by the reaction of 2-methyl-1,3-propane diol and an equimolar amount of boric acid. The polyester is formed upon heating the 2-methyl-1,3-propane diol and boric acid to 130 to 160° C., preferably about 135 to about 145° C. Heating to this temperature drives off water produced by esterification. Although the diol and boric acid are reacted in equi-molar amounts, an excess of either ingredient may be present without harming the reaction and any excess amount that does not materially affect the reaction is within the scope of the invention. For instance, if excess diol is present, the excess is evaporated during the heating. Further, excess boric acid will not materially affect the results since the excess tends to form polyborate which ultimately dissolves in the solution. Generally, up to about 10 weight percent excess boric acid can be tolerated.

It was further discovered that the condensation product formed between boric acid and 2-methyl-1,3-propane diol upon heating to about 130° C. to 160° C. is a high resistivity liquid (in excess of 100,000 ohm-cm) capable of producing a very high voltage anodic oxide on valve metals, particularly aluminum.

In another embodiment, the invention is directed to anodizing a valve metal substrate using the borate polyester electrolyte solution formed between boric acid and 2-methyl-1,3-propane diol.

The low melting point of the boric acid and 2-methyl-1,3-propane diol thermal condensation product and the relatively low viscosity above the melting point allows for a reduction of the anodizing temperature. That is, typical anodizing temperatures required for the condensation products of boric acid with, for example, triethylene glycol (150 to 160° C.) may be reduced to about 25 to 85° C. by employing the electrolyte of the present invention, realizing a large savings in heat supplied to the anodizing vessel.

The thermal condensation product of boric acid and 2-methyl-1,3-propane diol (i.e., the 2-methyl,1,3-propane diol-borate polyester) is particularly well suited to the growth of high voltage anodic valve metal oxide films, in particular aluminum oxide films. Anodic oxide films may be produced on aluminum at voltages as high as 3,000 volts, or even higher, through the use of this electrolyte. The invention may be employed for low voltage applications as well.

Although not limited to these temperatures, the present method is preferably operated in the temperature range of about 25 to about 85° C. The highest voltage anodic oxide films require lower anodizing temperatures of 25–50° C., while films formed at higher current densities and to somewhat lower voltages should be produced at temperatures of 50–85° C., where the lower viscosity allows a rapid escape of gas bubbles and the lower resistivity gives rise to a more uniform anodic oxide film thickness in a relatively short period of time.

The preferred operating temperature range of the electrolyte/method of the invention represents a large improvement over prior processes/electrolytes capable of operating at high voltages (above about 1,000 volts) because prior art electrolytes based upon boric acid/polyol condensation products required temperatures in excess of about 150° C. for sufficient fluidity for anodizing purposes.

The 2-methyl-1,3-propane diol may be obtained from Arco Chemical Company, for example, under the trade name of "MPDiol".

Although any valve metal may be used, the electrolyte and method of the invention are particularly useful for aluminum substrates.

The invention will be further described by reference to the following examples. These examples should not be construed in any way as limiting the invention.

EXAMPLES

Example 1

In order to demonstrate that the diol-borate polyester is the actual species involved in the anodizing described herein, Two beakers, A and B, were equipped with magnetic stirring bars and each was filled with the following:

150 grams of 2-methyl, 1,3-propane diol
100 grams of boric acid

Beaker A was heated sufficiently to dissolve the solids with stirring, 100–102° C., and was immediately removed from the source of heat (a hot plate) upon dissolution of the solids.

Beaker B was heated to 135–140° C., then removed from the hot plate.

The contents of both beakers were allowed to cool.

Beaker A yielded a large precipitate of boric acid at 75° C. and below.

Beaker B lost about 60 grams due to evaporation of the water produced by esterification and remained a clear, pale yellow fluid down to 25° C.

Example 2

The post-heating content of Beaker B of Example 1 was used to anodize an aluminum coupon to 2,500 volts at 60° C. by stepping the voltage up so as to maintain a current density of 1 mA/cm$^2$ or less. The total time above 2000 volts was 2 hours, 25 minutes.

S.E.M. examination of the oxide film on the bent coupon (bent to fracture the oxide to facilitate thickness measurement using the scanning electron microscope) revealed a relatively uniform, pore-free oxide having a thickness of approximately 2.2 microns or approximately 9–10 angstroms/volt. This thickness would be expected for an anodic oxide film of high quality. Crystalline aluminum oxide films grown in suitable organic acid containing electrolyte solutions at voltages of up to a few hundred volts exhibit a thickness of approximately 10 angstroms per volt at an anodizing temperature of 90° C.

Example 3

In order to illustrate the extremely efficient nature and high voltage capability of the invention, the following experiment was carried out.

A coupon was cut from low-purity commercial aluminum foil ("Reynold's Wrap") and was acetone-washed. This coupon was provided with a hydrated oxide (pseudoboehmite) surface coating by immersion in boiling de-ionized water for 10 minutes.

The coupon was then immersed in the post-heating contents of Beaker "B" of Example 1 at a temperature of 80° C. +/−10° C. A positive voltage bias was applied to the aluminum coupon in stepped fashion such that after 25 minutes, the voltage applied across the coupon/electrolyte was 3,000 volts (current=4.5 milliamperes). No sparking occurred during this process.

The coupon was kept at a positive potential of 3,000 volts relative to the electrolyte solution overnight (approximately 16 hours), during which time the temperature was allowed to drop to about 36° C. After 16 hours at 3,000 volts, the current had decayed from an initial value of 4.5 milliamperes to 0.2 milliampere. There was no sign of corrosion or electrolyte breakdown. The oxide was a slightly yellow gray color.

This is extraordinary anodizing performance even with very high purity aluminum foil and all the more so with an impure grade of aluminum. Clearly, higher anodizing voltages may be sustained through the use of this electrolyte/method than by the use of any other known traditional anodizing electrolyte/method.

It will be apparent to those skilled in the art that various modifications and variations can be made in the compositions and methods of the present invention without departing from the spirit or scope of the invention. Thus, it is intended that the present invention covers the modifications and variations of this invention provided they come within the scope of the appended claims and their equivalents.

What is claimed:

1. A method of anodizing a valve metal substrate comprising immersing the substrate in a borate polyester electrolyte solution and applying sufficient anodizing voltage to the solution; wherein the borate polyester electrolyte solution is formed by combining 2-methyl-1,3-propane diol and boric acid and heating to a temperature of about 130° C. to about 160° C.

2. The method of claim 1 wherein the temperature is about 135° C. to about 145° C.

3. The method of claim 1 wherein the valve metal is aluminum.

4. The method of claim 1 wherein the 2-methyl-1,3-propane diol and boric acid are reacted in about equi-molar amounts.

5. The method of claim 1 wherein the substrate is immersed in the borate polyester electrolyte solution at a temperature of about 25° C. to about 85° C.

6. The method of claim 5 wherein the substrate is immersed in the borate polyester electrolyte solution at a temperature of about 25° C. to about 50° C.

7. The method of claim 5 wherein the substrate is immersed in the borate polyester electrolyte solution at a temperature of about 50° C. to about 85° C.

8. An electrolyte composition comprising the reaction product of 2-methyl-1,3-propane diol and boric acid.

9. The electrolyte composition of claim 8 wherein the 2-methyl-1,3-propane diol and boric acid are heated to a temperature of about 130° C. to about 160° C.

10. The electrolyte composition of claim 9 wherein the wherein the temperature is about 135° C. to about 145° C.

11. The electrolyte composition of claim 8 wherein the 2-methyl-1,3-propane diol and boric acid are reacted in about equi-molar amounts.

* * * * *